United States Patent [19]

Bebinger

[11] 3,730,598
[45] May 1, 1973

[54] SELF-ALIGNING BEARING WITH MULTIPLE ASSEMBLY SEQUENCE

[75] Inventor: Jack E. Bebinger, Columbus, Ohio

[73] Assignee: Westinghouse Electric Corporation, Pittsburgh, Pa.

[22] Filed: June 8, 1971

[21] Appl. No.: 151,052

[52] U.S. Cl. ................................................308/132
[51] Int. Cl. ..............................................F16c 13/06
[58] Field of Search.........................308/72, 29, 135, 308/132

[56] References Cited

FOREIGN PATENTS OR APPLICATIONS 1,027,470  9/1954  Germany................................308/72

Primary Examiner—Charles J. Myhre
Assistant Examiner—Frank Susko
Attorney—F. H. Henson, E. C. Arenz and R. B. Farley

[57] ABSTRACT

The invention provides a self-aligning bearing, shaft and end bell in which the end bell includes a formed, partially spherical bearing surface that takes the angular thrust forces from the shaft. An end cap is rigidly mounted in a formed retaining pocket in the end bell to maintain a lubricating disk for the end of the shaft and the bearing. The assemblage requires only a minimum number of parts and is sufficiently flexible in design to permit an assembly of it by at least two different methods.

7 Claims, 2 Drawing Figures

PATENTED MAY 1 1973  3,730,598

SELF-ALIGNING BEARING WITH MULTIPLE ASSEMBLY SEQUENCE

BACKGROUND OF THE INVENTION

1. Field of the Invention

This invention relates to self-aligning bearing assemblies and, more specifically, relates to a bearing assembly for mounting the lower end of a motor driven shaft of a food waste disposer in an expeditious manner.

2. Description of the Prior Art

Many attempts have been made to provide self-aligning bearing structures so that close tolerances of the bearing parts and related elements was no longer necessary in order to provide a bearing assembly which operated with low noise and good durability. An example of such an arrangement is shown in U.S. Pat. No. 2,819,933, issued Jan. 14, 1958, and in which a self-aligning arrangement is provided for the mounting of one end of a shaft extending from a small electric motor. Another example of a self-aligning bearing structure is illustrated in U.S. Pat. No. 2,030,153, issued Feb. 11, 1936. During the time between the issuance of these two patents and since the issuance of the later of these two patents, many self-aligning arrangements have been provided, but, as in these two exemplary patents, the self-aligning arrangements were somewhat complicated and normally necessitated a specific assembly method dictated by the sequential interfitting of the parts of the assemblage. Thus, the manner of assembly of each of these self-aligning bearing arrangements was perhaps not the desired method, but the one which would conform to the elements being utilized.

Accordingly, it would be advantageous to provide a self-aligning bearing structure of simplified design, containing a very minimum of parts, and yet one which also offered a variety of assembly methods so that the self-aligning bearing structure would have some flexibility in its method of manufacture on the actual production line.

SUMMARY OF THE INVENTION

The invention discloses the manner of mounting the bottom end of a shaft for a food waste disposer or other apparatus having similar mounting requirements and includes an end bell for the housing of the disposer which is boltingly attached to the remainder of the housing. The end bell includes, mediately disposed of its generally annular shape, a tubular barrel portion of truncated spherical shape that is formed in the end bell by any standard forming operation. This truncated spherical shape provides a seating means for the reception of a bearing member having a similar peripheral shape and a centrally disposed bore therethrough for mounting on the lower end of the shaft of an electric motor that drives the comminuter of the food waste disposer. Because of the truncated spherical barrel shape, the end bell of the food waste disposer housing absorbs some of the angular thrust loads which are transmitted from the shaft and, further, the bearing member seats itself relative to the barrel portion of the end bell so as to conform thereto and provide self-aligning. Thus, as the shaft rotates, the bearing member conforms closely to the barrel shape to provide quiet running and durable operation.

The end bell also includes a centrally disposed substantially annular depression having a diameter which is considerably larger than the diameter of the tubular barrel portion which receives a bearing cap member that limits axial movement of the bearing. The bearing cap member, in side view, has a shape of approximately that of a hat and includes a peripheral rim with a series of four equally spaced, radially extending prongs or tangs that resiliently engage within the annular depression in the end bell so as to rigidly maintain the bearing cap in fixed, assembled relationship relative to it. Normally disposed between this end cap and the end of the motorized shaft is a felt-like lubrication disc of cylinder shape, with this felt-like disc abuttingly engaging the end of the shaft and bearing against the internal periphery of that portion of the bearing cap that forms the crown of the hat shape.

The end of the shaft, end bell, barrel shaped bearing member, felt disc and bearing cap thereby provide a self-aligning and lubricated bearing assembly that has low noise and little vibration during running and, therefore, is very durable.

DRAWING DESCRIPTION

For a better understanding of the invention, reference may be had to the preferred embodiment, exemplary of the invention, shown in the accompanying drawings in which:

FIG. 1 is a front elevational view of a food waste disposer unit with a portion thereof which relates to the instant invention shown in cross section, and FIG. 2 is a plan view of the bearing cap which comprises an element of the instant invention.

DESCRIPTION OF THE PREFERRED EMBODIMENT

Figure 1:
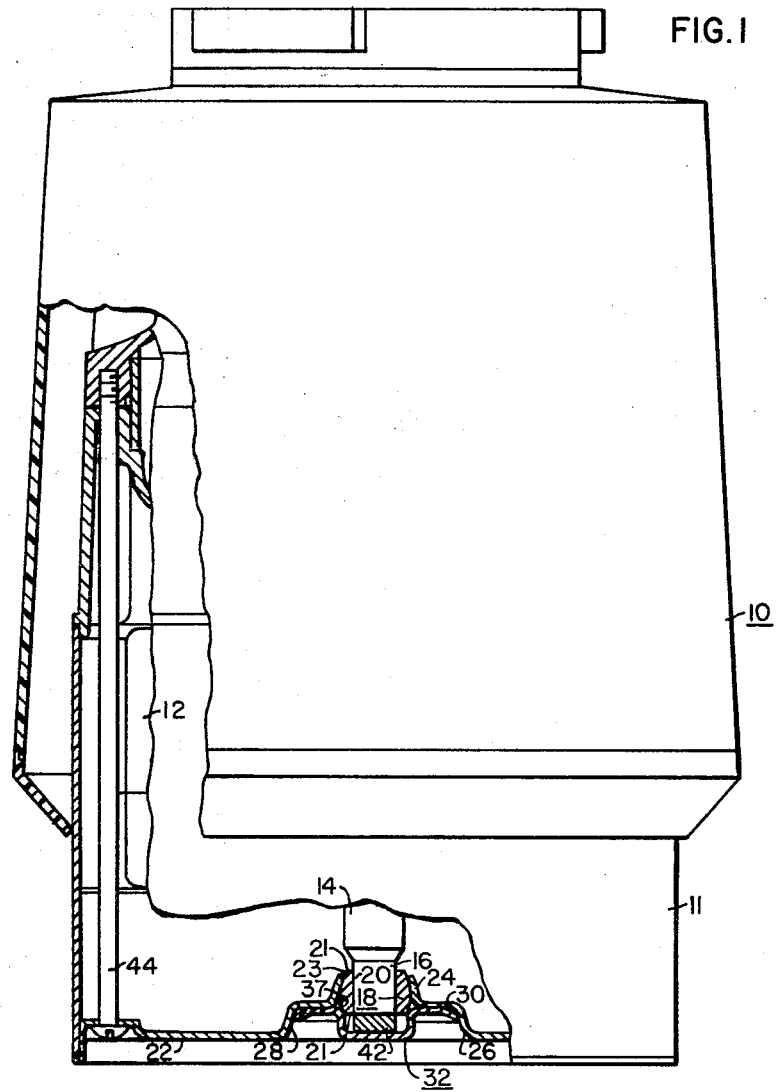

Referring now to FIG. 1, it can be seen that a food waste disposer 10, including housing 11, is provided having a motor 12 that drives the comminuter blades (not shown) of the garbage grinder for the reduction of food waste to small particles. A shaft 14 for the motor 12 is journalled at its upper end (not shown) and extends downwardly within the food waste disposer 10 to find support at its lower end by the novel arrangement heretofore briefly described.

A necked down portion 16 of shaft 14 is received in rotating relationship relative to a bearing member 18, with the bearing member 18 including a centrally disposed, annular bore 20 extending through it for the reception of this portion of the shaft. The bearing member 18, at it outer periphery, takes the general configuration of a truncated sphere or barrel, with this shape being formed substantially as if a sphere had had its two ends sliced off to provide a pair of flat faces 21, 21 in the area where the poles would be located and a uniformly curved surface 23 therebetween.

The bearing member 18 is housed within an end bell 22 for the food waste disposer 10, the same having a bearing receiving portion 24 formed therein by a conventional forming process and shaped to conform to a portion of the outer barrel configuration of the bearing member 18. Bearing receiving portion 24, however, is of shorter height than the height of the bearing member 18, so that it provides a reception means therefor for only about one half the bearing member's height. The bearing receiving portion 24 thereby provides for any angular displacement of the bearing member 18 since the barrel shape of the bearing member 18 is free to rotate from the vertical axis to accommodate any misalignment of shaft 14 relative to end bell 22. Thus, angular thrust loading and self-alignment of the shaft 14 is compensated for by the arrangement of the bearing member 18 and bearing receiving portion 24.

The end bell 22 also includes an inwardly extending annular depression 26, also formed therein by any conventional method, which is centrally disposed relative to the end bell 22 and the shaft 14. Annular depression 26 has a diameter which is substantially larger than the diameter of bearing portion 24 so as to place its generally annular side wall 28 in an outer, removed location relative to the location of the bearing receiving portion 24. Annular depression 26 also includes a face portion 30 that serves as a bottom for annular depression 26 so that the face portion 30 and cylindrical wall 28 provide a convenient reception means for a bearing cap 32 which is disposed therein.

Figure 2:
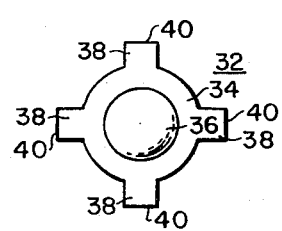

Bearing cap 32 (FIGS. 1 and 2) is generally hat shaped, in elevation, having an annular rim 34 and a crown portion 36. Extending radially outwardly from the annular rim 34 are a series of tangs or prongs 38, that are equally spaced around the rim 34. These tangs must be at least two in number for positive securement, but, in the embodiment illustrated, the bearing cap 32 is provided with four tangs. Each of the tangs 38 is generally rectangular in plan view and includes an end 40 at its termination that provides an abutting surface for mating interengagement with the annular depression 26. More specifically, the distance between the ends 40 of opposed tangs 38 is slightly larger than the diameter of the annular depression 26 so that the bearing cap 32 is force fit into the annular depression 26, with the tangs 38 bending slightly downwardly away from the face portion 30 of annular depression 26 to bear bitingly and tightly against the side wall 28 of annular depression 26 when intermediate portions of the tangs abut the face portion 30. The bearing cap 32 may thereby be conveniently and quickly assembled to the end bell 22 and this bearing cap utilized to cover the ends of shaft 14 and bearing member 18 as will now be explained. The effectiveness of the bight of bearing cap 32 may be increased by a slight pre-bending of the tangs 38 or by giving them a "V" shape.

Disposed within bearing cap 32 and conforming to the generally inward peripheral surface of crown portion 36, is a felt-like disc 42 having the shape of a cylinder of very short height. With the felt disc 42 assembled within the bearing cap 32, this felt disc may provide a convenient lubricating pool for the lubrication of bearing member 18.

The bearing cap 32 also limits axial movement of bearing member 18 by means of that portion of bearing cap 32 at an intersection 37 of the annular rim 34 and crown portion 36. Since this intersection represents a curved surface, it offers support for the bearing member 18 even if the same is canted from the vertical to provide self-alignment.

Because of the simplified construction of the self-aligning bearing arrangement just described, the same has great flexibility in the manner in which it is assembled with the food waste disposer 10. One method which can be utilized is initially assembling the bearing member 18 within end bell 22 in bearing receiving portion 24 and then maintaining these two parts in an assembled relation by the use of bearing cap 32. Of course, felt disc 42, if used, would be assembled within bearing cap 32 at this time. End bell 22, bearing member 18 and bearing cap 32 can then be assembled over shaft 14 and the end bell 22 attached to food waste disposer 10 by means of a pair of threaded screws 44 that are extended upwardly through end bell 22 and threadedly received within an upper portion of food waste disposer 10. When the self-aligning bearing arrangement is assembled to the food waste disposer 10, as described, no problem of alignment exists if the end bell 22 is carefully tightened to the food waste disposer so that little distortion of it occurs. Since only a pair of screws 44 is utilized, this distortion can easily occur if care is not exercised. Of course, utilization of a larger number of screws would entail more expense.

Assembly of the self-aligning bearing arrangement can also be obtained in the currently preferred mode by first mounting the end ball 22 to the food waste disposer 10 and then assembling the bearing member 18, bearing cap 32 and included felt wick disc 42 on the shaft 14. If this assembly method is utilized, it permits pre-aligning of the bearing and shaft assembly after end bell tightening so that unequal torqueing of threaded screws 44 cannot affect the final assembly of the self-aligning bearing arrangement and food waste disposer 10.

It should be obvious to one skilled in the art that a self-aligning bearing assembly has been described which has a reduced number of parts and a multiple assembly sequence that provides for flexibility during the manufacturing operation. Further, it should be obvious that many derivations of the invention could be provided which would still fall within the spirit and scope of the description offered.

What is claimed is:

1. A self-aligning bearing arrangement for bearingly mounting a shaft driven by a motive means including:
   a. a formed member having a partially spherical bearing seating surface disposed integrally therewith,
   b. said shaft extending through said partially spherical bearing seating surface and terminating in an end,
   c. a truncated spherical bearing disposed on said bearing seating surface and mounting said shaft by a bore extending therethrough,
   d. a cap means including a series of outwardly extending tangs,
   e. said cap means being disposed in an annular depression in said formed member,
   f. said tangs engaging the side of said annular depression for maintaining said cap means fixed relative to said formed member and said truncated spherical bearing, and
   g. a wick element for lubrication disposed between said cap means and said end of said shaft.

2. A self-aligning bearing arrangement for the bearing mounting of a motor driven shaft including:
   a. a housing for a motor,
   b. said housing including an end closure means for one end of the same, c. said end closure means including an integrally formed seating surface of partially spherical shape opening outwardly relative to said housing,
d. said shaft extending through said closure means in the area of said seating surface,
e. a partially spherical bearing means disposed on said shaft and supported on said seating surface,
f. a one piece cap means for covering said opening and for axially maintaining said partially spherical bearing means on said shaft and seating surface by directly bearing against bearing means, and
g. a wick element for lubrication disposed between said cap means and said shaft.

3. The self-aligning bearing arrangement of claim 2 wherein:
a. said one piece cap means includes a series of outwardly extending tangs, and
b. said end closure means includes an annular depression for fixedly receiving said tangs for maintaining said one piece cap means rigid relative to said end closure means.

4. The self-aligning bearing arrangement of claim 2 wherein:
a. said one piece cap means maintains said spherical bearing means axially by engaging said partially spherical bearing means.

5. The self-aligning bearing arrangement of claim 4 wherein:
a. said one piece cap means includes an annular rim and a crown portion, and
b. said engagement of said cap means with said partially spherical bearing means occurs at the intersection of said annular rim and said crown portion of said cap means.

6. The self-aligning bearing arrangement of claim 2 wherein:
a. said end closure means includes an integrally formed annular depression of greater diameter than said integrally formed seating surface, and
b. integrally formed engaging means on said one piece cap means for engaging in said annular depression and maintaining said partially spherical bearing means axially.

7. A motor end closure and bearing arrangement for the lower end of a motor disposed with its shaft substantially vertical, comprising:
a. a motor lower end bell having a centered opening defined by an edge of an inwardly directed partly spherically shaped bearing seat, said seat being centered in an inwardly directed, circular embossment of larger diameter than said seat;
b. a partly spherical bearing having opposite inboard and outboard spherically shaped shoulders, one of said shoulders being received in gimballing relation in said seat;
c. a cap for retaining said bearing in place, said cap including an upwardly open cup-shaped portion with a circular rim portion providing a seat for said outboard shoulder in gimballing relation, said cap further including a plurality of radially outwardly directed arms dimensioned so that the outer ends of said arms engage the axially extending walls of said embossment when said cap is pressed into place in said embossment and cause deflection of said arms in an outboard direction at their ends so that said cap is frictionally held in place, and
d. a lubricating pad located in said cup-shaped portion of said cap for said shaft in said bearing.

* * * * *